(12) United States Patent
Chambarakatta et al.

(10) Patent No.: US 9,693,196 B2
(45) Date of Patent: Jun. 27, 2017

(54) DETECTION OF WIRELESS POWER TRANSMITTERS

(71) Applicant: Intel IP Corporation, Santa Clara, CA (US)

(72) Inventors: Mahalingeshwara Chambarakatta, Bangalore (IN); Guruprasad C S, Bangalore (IN); Anand Kalyanakrishnan, Bangalore (IN); Keshava Murthy Buddappa Sallapuri, Bangalore South Taluk (IN)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/861,183

(22) Filed: Sep. 22, 2015

(65) Prior Publication Data

US 2017/0086027 A1    Mar. 23, 2017

(51) Int. Cl.
| | |
|---|---|
| H04W 4/02 | (2009.01) |
| H04W 4/06 | (2009.01) |
| H02J 7/02 | (2016.01) |
| H02J 7/04 | (2006.01) |

(52) U.S. Cl.
CPC ............ *H04W 4/025* (2013.01); *H02J 7/025* (2013.01); *H02J 7/042* (2013.01); *H04W 4/06* (2013.01)

(58) Field of Classification Search
CPC ......... H04W 4/02; H04W 4/021; H04W 4/20; H04W 4/023; H04W 48/16; H04W 48/20; H04W 52/026; H04W 52/0267; H04W 52/0277; H04W 64/00; H04W 4/006; H04W 4/008; H04W 4/12; H04W 4/14; H04W 76/00; H04W 76/02; H04W 76/04; H04B 5/00; H04B 5/0037; H02J 50/05; H02J 50/06; H02J 50/07; H02J 50/08; H02J 50/30
See application file for complete search history.

(56) References Cited

U.S. PATENT DOCUMENTS

| | | | | |
|---|---|---|---|---|
| 9,461,498 | B2* | 10/2016 | Son .................... | H02J 7/025 |
| 2009/0312046 | A1* | 12/2009 | Clevenger ............. | H02J 17/00 455/522 |
| 2010/0315045 | A1* | 12/2010 | Zeine ................... | H02J 7/025 320/137 |

(Continued)

FOREIGN PATENT DOCUMENTS

| | | |
|---|---|---|
| WO | 2014061935 A2 | 4/2014 |
| WO | 2014163282 A1 | 10/2014 |

OTHER PUBLICATIONS

EP Search Report, EP Application No. 16184068, mailing date Dec. 15, 2016, 2 pages.

*Primary Examiner* — Meless Zewdu
(74) *Attorney, Agent, or Firm* — International IP Law Group, P.L.L.C.

(57) ABSTRACT

Techniques for locating a power transmission unit (PTU) in a system, method, and apparatus are described herein. For example, an apparatus may include a power detector to detect a low battery condition of the apparatus. The apparatus may also include a PTU locator to perform a PTU scan in response to the low battery condition, the PTU scan to identify a location of the PTU. The apparatus may also further include a PTU location displayer to display a location of the PTU based on the results of the PTU scan.

23 Claims, 8 Drawing Sheets

(56) References Cited

U.S. PATENT DOCUMENTS

| | | | |
|---|---|---|---|
| 2011/0115432 A1* | 5/2011 | El-Maleh | G06Q 30/0267 320/108 |
| 2011/0279079 A1* | 11/2011 | Do Valle | H02J 7/04 320/107 |
| 2011/0313603 A1* | 12/2011 | Laberteaux | B60L 11/184 701/22 |
| 2012/0286724 A1* | 11/2012 | Tsai | H02J 7/025 320/108 |
| 2012/0299966 A1 | 11/2012 | Kim et al. | |
| 2013/0221915 A1* | 8/2013 | Son | H02J 7/025 320/108 |
| 2014/0247004 A1* | 9/2014 | Kari | H02J 5/005 320/106 |
| 2014/0267059 A1* | 9/2014 | Deokar | G06F 3/0416 345/173 |
| 2015/0022018 A1 | 1/2015 | Kim et al. | |
| 2015/0073642 A1* | 3/2015 | Widmer | G01C 21/36 701/22 |
| 2015/0278038 A1* | 10/2015 | Halker | G06F 11/20 714/3 |
| 2016/0043590 A1* | 2/2016 | Ha | H02J 7/025 320/108 |
| 2016/0099757 A1* | 4/2016 | Leabman | H04B 5/0037 307/104 |
| 2016/0141908 A1* | 5/2016 | Jakl | H02J 7/025 320/108 |
| 2016/0190850 A1* | 6/2016 | Jeganathan | H02J 7/025 320/108 |
| 2016/0191121 A1* | 6/2016 | Bell | H04B 5/0037 307/104 |
| 2016/0249157 A1* | 8/2016 | Fine | H01Q 1/248 |

* cited by examiner

DETECTION OF WIRELESS POWER TRANSMITTERS

TECHNICAL FIELD

This disclosure relates generally to techniques for wireless charging. Specifically, this disclosure relates to locating wireless power transmitters.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some cases, a PRU may be implemented in a computing device, such as a mobile computing device, that can be placed on a charging mat including a PTU. For example, the charging mat may be placed on a desk or a countertop in a home for a mobile computing device to be placed on and charged.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
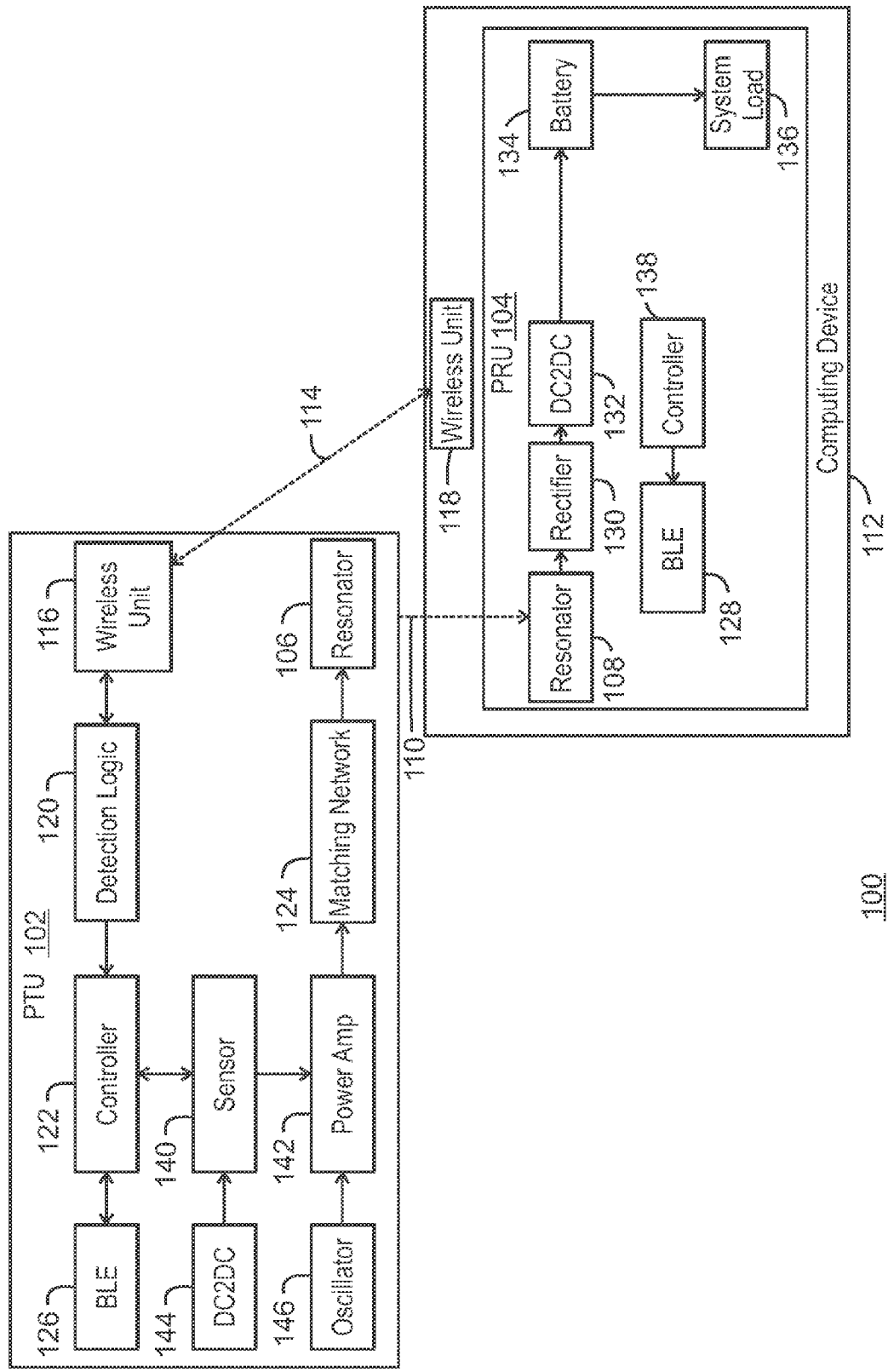
FIG. 1 is block diagram of a PTU to provide power to a PRU, wherein the PTU includes logic configured to configure a coil based on a detected condition.

The present disclosure relates generally to techniques for detecting wireless charging stations. Specifically, the techniques described herein include using wireless technologies to exchange data between a PTU and a device with a PRU. As discussed above, in some cases, the location of a wireless charging mat may be readily known, such as when a wireless charging mat is used at home. However, in some cases, a wireless charging station may be not be so easily discovered. For example, wireless charging stations may be implemented in public spaces. The wireless charging stations may be embedded within structures and/or not be readily discoverable. The techniques described herein enable users of mobile computing devices containing PRUs to quickly discover and locate public wireless charging stations that may be hidden from view or otherwise not readily discovered.

The techniques described enable a computing device to locate a PTU and display the location of the PTU. For example, the location of the PTU can be displayed on a map or similar graphical interface on the computing device with a PRU. In general, the techniques described herein include power detector to detect a low battery condition, a PTU locator to locate a PTU via a wireless connection, and a PTU displayer to display the location of a PTU on a computing device with a PRU.

Further, in some cases, the wireless connection used to can be a short range radio connection. In some examples, the wireless connection can also be a local area network connection, as discussed in more detail below.

In some cases, the techniques discussed herein may be implemented in part using a wireless charging standard protocol, such as the specification provided by Alliance For Wireless Power (A4WP) version 1.3, Nov. 5, 2014. For example, a dynamic parameter, as referred to herein, is a parameter from the PRU Dynamic parameters same as specified in specification provided by Alliance For Wireless Power (A4WP) version 1.3, Nov. 5, 2014. A static parameter, as referred to herein, includes location parameters longitude and latitude of PTU location in addition to the PTU Static parameters specified in specification provided by the Alliance For Wireless Power (A4WP) version 1.3, Nov. 5, 2014. A control characteristic, as referred to herein is a parameter from PTU control characteristics as specified in specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable. In addition, the techniques discussed herein may also be implemented using a wireless communication standard protocol, such as the specification provided by IEEE 802.11™ 2012, Mar. 29, 2012.

FIG. 1 is block diagram of a PTU to provide power to a PRU, wherein the PTU includes logic to exchange information with a PRU based on a detected scan parameter. A PTU 102 may couple to a PRU 104 via magnetic inductive coupling between resonators 106, and 108, as indicated by the arrow 110. The resonator 106 may be referred to herein as a Tx coil 106 of the PTU 102. The resonator 108 may be referred to herein as an Rx coil 108 of the PRU 104. The PRU 104 may be a component of a computing device 112 configured to receive charge by the inductive coupling 110. The PTU 102 may also couple to the PRU via a wireless connection 114 between a wireless unit 116 of the PTU 102 and a wireless unit 118 of the computing device 112. Although shown outside the PRU 104 in FIG. 1, in some examples, the wireless unit 118 can be located within the PRU 104.

As illustrated in FIG. 1, the PTU 104 may include logic 120. The logic 120 may be referred to herein as detection logic 120. The detection logic 120 may be configured as an integrated component of the PTU 102, such as a component of a controller 122, a component of the matching network 124, as a separate component, of as an integrated component any other component of the PTU 102, or any combination thereof.

In any case, the detection logic 120 may be configured to start a BLE advertisement or a wireless local area network connection scan to connect to a PTU and obtain location information. For example, an advertisement, scan request, and scan response can be used in a BLE advertisement to connect to a PTU. A probe request and probe response can be used in a wireless local area network connection scan to connect to a PTU. In some examples, the detection logic 120 can detect a PTU scan parameter in an advertisement or probe request from the wireless unit 116. For example, the PTU scan parameter can include a description of one or more features of a compatible charging station. Upon detection of a PTU scan parameter from the wireless unit 116, the detection logic 120 may be configured to send a scan request and a connection request to the wireless unit 118. The PTU 102 and the PRU may then exchange information that enables the PRU to determine compatibility and location of the PTU. For example, the information can include device category information, device class information, and PTU power information, among other information. The information can also include location information such as a latitude and longitude of the PTU. As another example, a wireless handshake between the PTU 102 and the PRU 104 may be used to exchange information. In some cases, the wireless handshake can be performed by a Bluetooth Low Energy (BLE) module 126 of the PTU 102 and a BLE module 128 of the PRU 104. In the A4WP standard, the wireless handshake may indicate a size category of the PRU 104 having a predefined reactance shift detected at the matching network 124. However, in some examples, the wireless handshake may include additional device information as discussed in greater detail with respect to FIG. 2 below.

The detection logic 120 may be composed of one or more components, such as electronic circuit components. In some cases, the detection logic 112 may be composed of one or more modules that can interact with both the wireless unit 116 and the controller 122. Additional details are discussed in more detail below in regard to FIG. 2, as well as throughout the present description, Figures, and claims.

In FIG. 1, inductive coupling may occur between the Tx coil 106 and the Rx coil 108, and as a magnetic flux associated with the inductive coupling passes through the Rx coil 108, the computing device 112 may receive power. A rectifier 130 may receive voltage having an alternating current (AC) from the Rx coil 108 and may be configured to generate a rectified voltage (Vrect) having a direct current (DC). As illustrated in FIG. 1, a DC2DC converter 132 provides a DC output to a battery 138 and a system load 140.

The PRU 104 may also include a controller 138 configured to initiate a wireless broadcast having wireless handshake data. As discussed above, the wireless handshake broadcast may be carried out by a wireless data transmission component such as BLE module 128. In some cases, the wireless data transmission component may be integrated as operations of the controller 138, the direct current to direct current (DC2DC) converter 132, or any combination thereof. In some examples, the controller 138 may be configured to initiate a wireless broadcast via the wireless unit 118. In some examples, the wireless unit 118 can be included within the PRU 104.

The PTU 102 may include the BLE module 126 configured to communicate with the BLE module 128. The PTU 102 may also include a current sensor 140, a controller 122, a power amplifier 142, a DC2DC converter 144, an oscillator 146, and the matching network 124. The current sensor 140 may be an ampere meter, a volt meter, or any other sensor configured to sense load variations occurring due to inductive coupling between the PTU 102 and another object, such as the PRU 104. The current sensor 140 may provide an indication of load change to the controller 122 of the PTU 102. The controller 122 may power on the power amplifier 142 configured to receive direct current (DC) from the DC2DC converter 144, and to amplify and oscillate the current. The oscillator 146 may oscillate the power provided at a given frequency and the matching network 124 may be used to match the amplified oscillation provided to the resonator 106 of the PTU 102.

In some examples, the BLEs 126, 128 can thus be used to exchange information via a short range radio connection to enable the computing device 112 to display the location of the PTU 102 on a display. For example, the location of the PTU 102 can be displayed on a PTU location map on a screen of the computing device 112.

In some examples, the wireless units 116, 118 can be used to change information via a wireless local area network connection to enable the computing device 112 to display the location of the PTU 102 on a display. For example, The BLEs 126, 128 can then be used as described above to exchange information to enable the PTU to charge the PRU via an inductive coupling between the resonators 106, 108.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
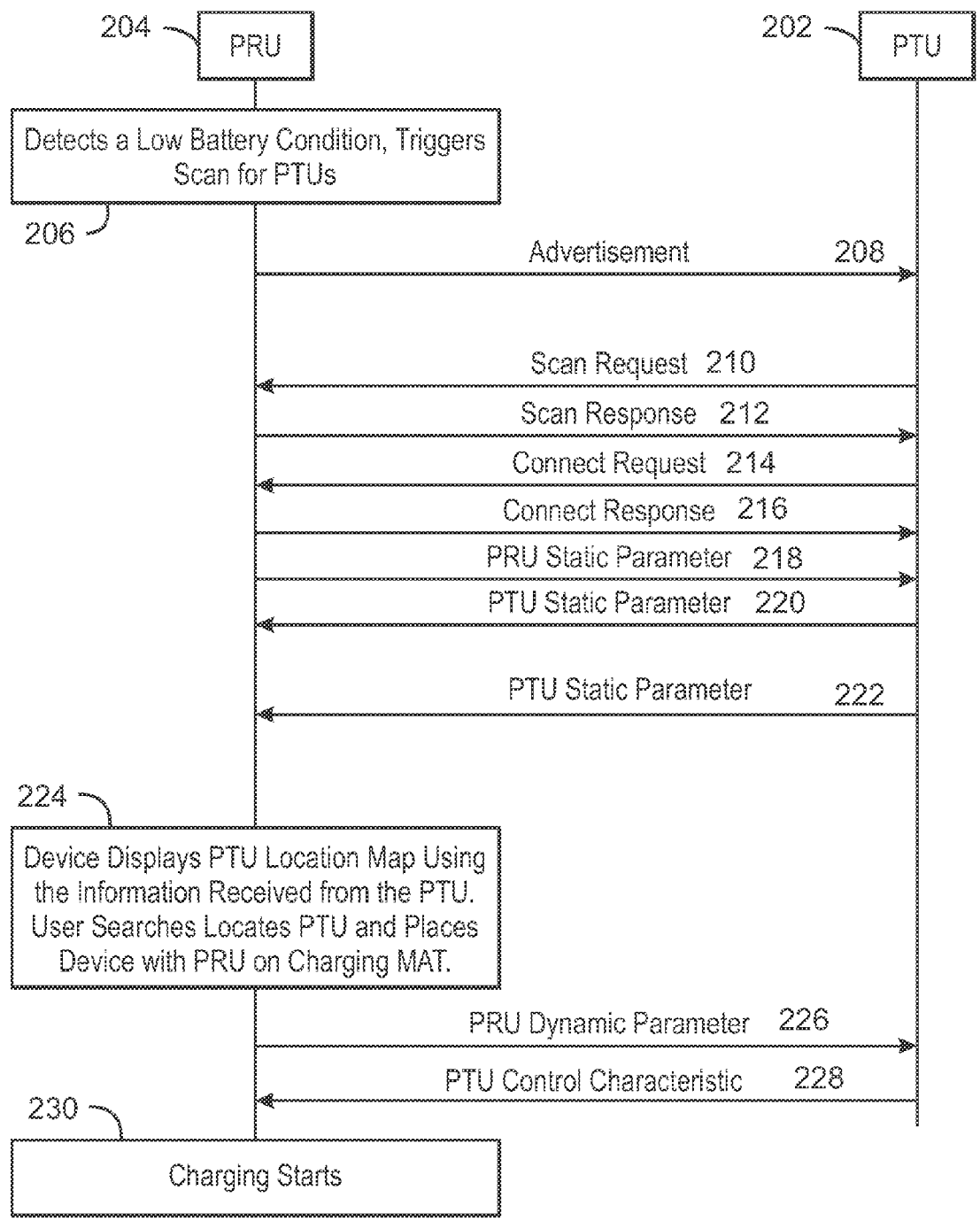
FIG. 2 is a timing diagram illustrating a process for locating a PTU via a short range radio connection.

FIG. 2 is a timing diagram illustrating a process for locating a PTU via a short range radio connection. The example process is referred to generally by the reference number 200 and can be implemented using the computing device 700 of FIG. 7 below. For example, the example process 200 can be performed by the PTU and PRU of FIG. 1 above.

The example process 200 is shown implemented using a PTU 202 and a PRU 204. At block 206, the PRU 204 detects a low battery condition and triggers a scan for PTUs. For example, the low battery condition can correspond to a low battery level of a computing device including the PRU 204. The PTUs can be one or more PTUs within wireless range of the PRU 204. At time 208, the PRU 204 broadcasts an advertisement that can be used to detect nearby compatible PTUs. As used herein, a compatible PTU refers to a PTU supporting the techniques described herein. The advertisement can include a PTU scan parameter that can be used to determine compatibility. For example, the PTU scan parameter can include a description of one or more features of a compatible charging station. The advertisement can be broadcasted to all PTUs capable of receiving the advertisement and are within range of the PRU 204. In some examples, compatible PTUs may respond to the advertisement. At time 210, the PTU 202 sends a scan request to the PRU 204. For example, the scan request can be used by the PTU 202 to obtain extended information about the PRU prior to connection. In some examples, the PTU 202 may be compatible with the PRU and have detected the PTU scan parameter in the advertisement and responded by sending the scan request. At time 212, the PRU 204 sends a scan response to the PTU 202. For example, the scan response can include extended information about the PRU. At time 214, the PTU 202 sends a connect request to the PRU 204 to establish a connection with the PRU. At time 216, the PRU 204 sends a connect response to the PTU 202 establishing a connection with the PTU. At time 218, the PRU 204 sends a PRU static parameter to the PTU 202. For example, the PRU static parameters can include a PRU device category, a PRU device class, among other information. At time 220, the PTU 202 sends a PTU static parameter to the PRU 204. For example, the PTU static parameter can include a PTU device class, PTU power information, and/or location information such as a longitude of the PTU and a latitude of the PTU, among other information. At time 222, the PTU 202 sends a PTU static parameter to the PRU 204. For example, the PTU static parameters can include a PTU device class, PTU power information, and/or location information such as a longitude of the PTU and a latitude of the PTU, among other information.

At block 224, the PRU 204 displays a PTU location map using the information received from the PTU 202. For example, the location map can be displayed to a user, and the user can locate and place the PRU 204 onto the PTU 202. In some examples, the PTU 202 may be included in a charging mat that the PRU 204 can be placed upon. At time 226, the PRU 204 sends a PRU dynamic parameter to the PTU 202. For example, the PRU dynamic parameter can include information such as current rectifier voltage, current, and temperature, among other information. At time 228, the PTU 202 sends a PRU control characteristic to the PRU 204. For example, the PRU control characteristic can include information such as an enable or disable charge port parameter, an adjust power parameter, etc. The PRU control characteristic can be used by a charge output to start charging the device.

At block 230, the PRU 204 may begin charging. For example, the PRU 204 can be inductively coupled to the PTU 202 as described in detail with respect to FIG. 1 above.

Figure 3:
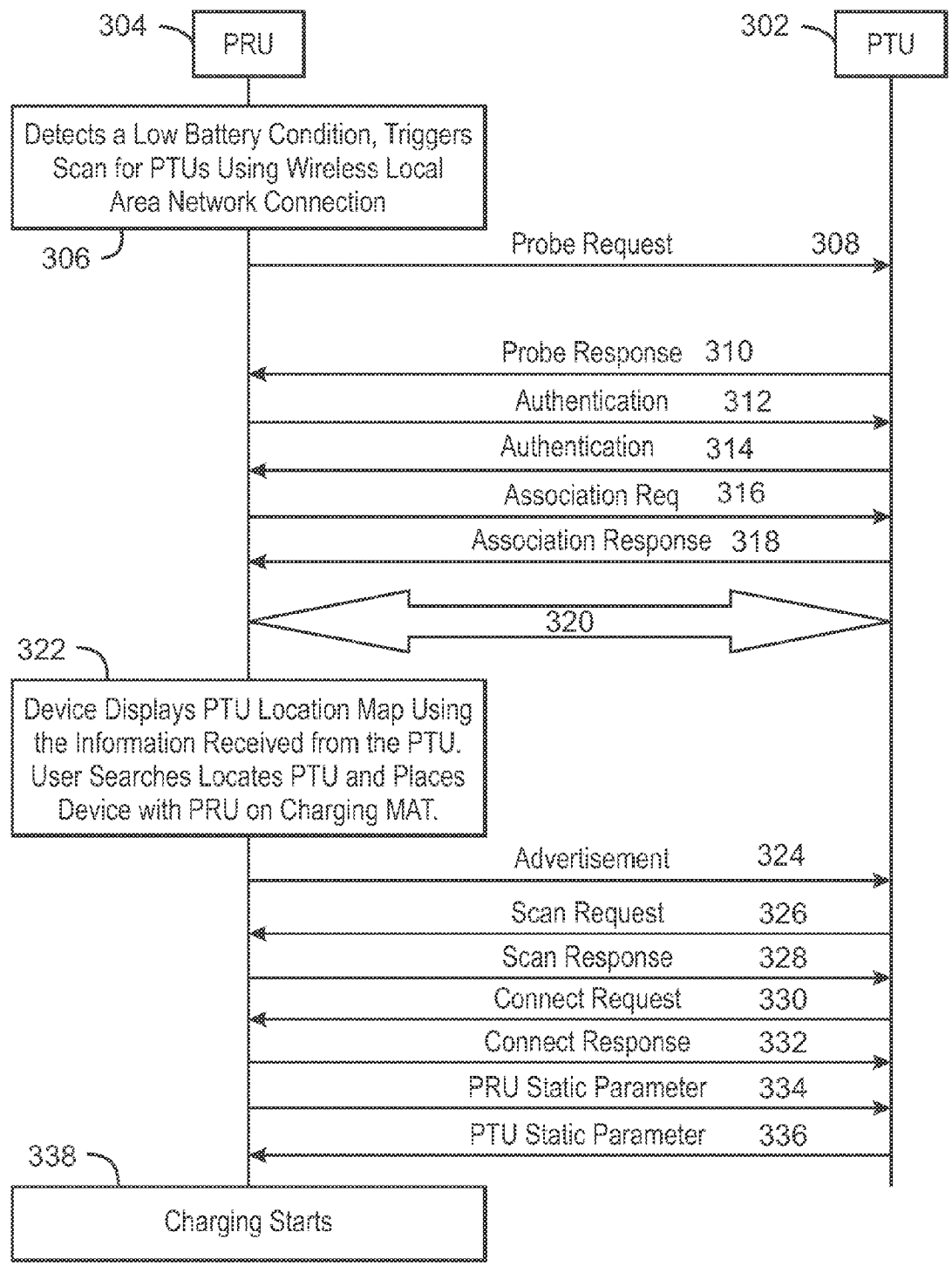
FIG. 3 is a timing diagram illustrating a process for locating a PTU via a wireless local area network.

FIG. 3 is a timing diagram illustrating an example process for locating a PTU via a wireless local area network. The example process is referred to generally by the reference number 300 and can be implemented using the computing device 700 of FIG. 7 below. For example, the example process 300 can be performed by the PTU and PRU of FIG. 1 above.

The example process 300 is shown implemented using a PTU 302 and a PRU 304. At block 306, the PRU 304 detects a low batter condition and triggers a scan for PTUs using a wireless local area network. For example, the wireless local area network may be using a Wi-Fi™ wireless local area network according to the IEEE 802.11 standard described above. At time 308, the PRU sends a probe request including a PTU scan parameter to the PTU 302. For example, the probe request can include one or more capabilities of the PRU. At time 310, the PTU 302 sends a probe response to the PRU 304. For example, the PTU 302 may be capable of receiving wireless local area network connections. In some examples, the PTU 302 can be coupled to a wireless local area network access point that can receive probe requests. In some examples, the probe response can include a wireless network name of the PTU and capabilities of the PTU. At time 312, the PRU 304 may optionally send an authentication request to the PTU 302. At time 314, the PTU 302 can send an authentication response to the PRU 304 in response to detecting the authentication request. At time 316, the PRU 304 sends an association request to the PTU 302. For example, the association request can include wireless compatibilities of the PRU. At time 318, the PTU 302 sends an association response to the PRU 304. For example, the association response can include an association ID for the PRU. At time 320, the PRU 304 can receive PTU location information and PTU class information, in addition to power information, etc., from the PTU 302. In some examples, the PTU 302 can receive PRU device category information and the class of device information, etc., from the PRU 304.

At block 322, the device that includes the PRU 304 can display a PTU location map. For example, the device can display the location map using the information received from the PTU 302. The device can display the location of the PTU 302 to the user, and the user can find the PTU 302 and place the PRU 304 in proximity to the PTU. For example, the PRU 304 can be placed upon a charging mat that includes the PTU 302.

After the device is placed in proximity to the PTU 302, at time 324, the PRU 302 sends an advertisement. For example, in the example of 300, the advertisement can BLE advertisement can be used to establish a BLE connection. The advertisement can be sent to the PTU 302. At time 326, the PTU 302 sends a scan request to the PRU 304. For example, the PTU 302 may have detected the advertisement and responded by sending the scan request. At time 328, the PRU 304 sends a scan response to the PTU 302. At time 330, the PTU 302 sends a connect request to the PRU 304. At time 332, the PRU 304 sends a connect response to the PTU 302. At time 334, the PRU 304 sends a PRU static parameter to the PTU 302. For example, the PRU static parameters can include a PRU device category, a PRU device class, among other information. At time 336, the PTU 302 sends a PTU static parameter to the PRU 304. For example, the PTU static parameter can include a PTU device class, PTU power information, among other information.

At block 338, the PRU 304 may begin charging the device. For example, the PRU 304 can be inductively coupled to the PTU 302 as described in detail with respect to FIG. 1 above.

The diagram of FIG. 3 is not intended to indicate that the example process 300 is to include all of the components shown in FIG. 3. Rather, the example process 300 can be implemented using fewer or additional components not illustrated in FIG. 3 (e.g., additional client devices, access points, host devices, etc.). In one embodiment, the process 300 of FIG. 3 is intended to indicate that the steps of the process 300 are to be executed in a particular order. Alternatively, in other embodiments, the steps of the process 300 can be executed in any suitable order and any suitable number of the steps of the process 300 can be included. Further, any number of additional steps may be included within the process 300, depending on the specific application.

Figure 4:
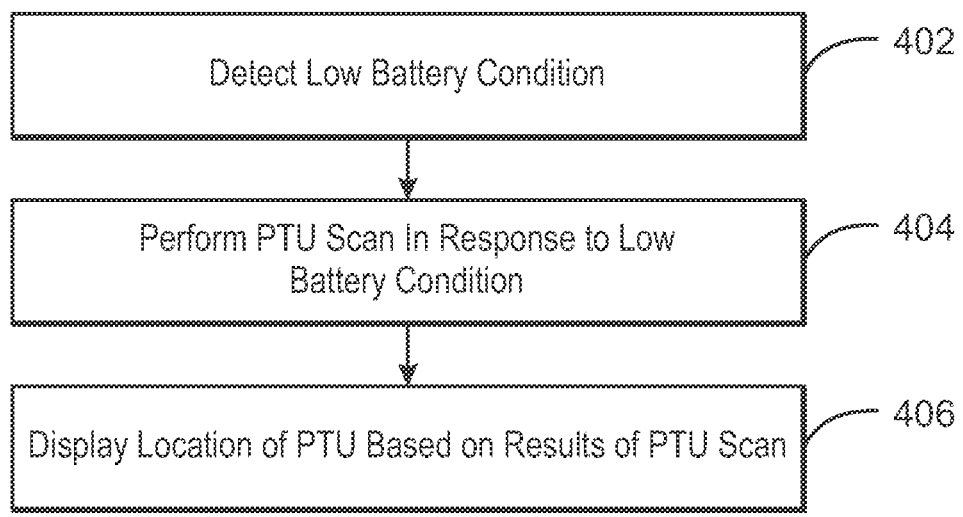
FIG. 4 is a flow chart illustrating a process for locating a PTU according embodiments described herein.

FIG. 4 is a flow chart illustrating a process for locating a PTU according embodiments described herein. The process is generally referred to by the reference number 400 and can be performed by the computing device 112 of FIG. 1 or the computing device 700 of FIG. 7 below.

At block 402, the computing device detects a low battery condition. For example, the battery of the computing device including a PRU may be low. In some examples, the detection of a low battery can trigger the performance of a PTU scan at block 404.

At block 404, the computing device performs a PTU scan in response to the low battery condition. For example, the PTU scan can be performed via a wireless local area network or a short range radio connection according to process of FIG. 5 or 6, respectively, as described in detail below. The PTU scan can identify the location of a compatible PTU.

At block 406, the computing device displays a location of a PTU based on the results of the PTU scan. For example, the computing device can display the location of the PTU via a PTU location map using location information received from the PTU.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
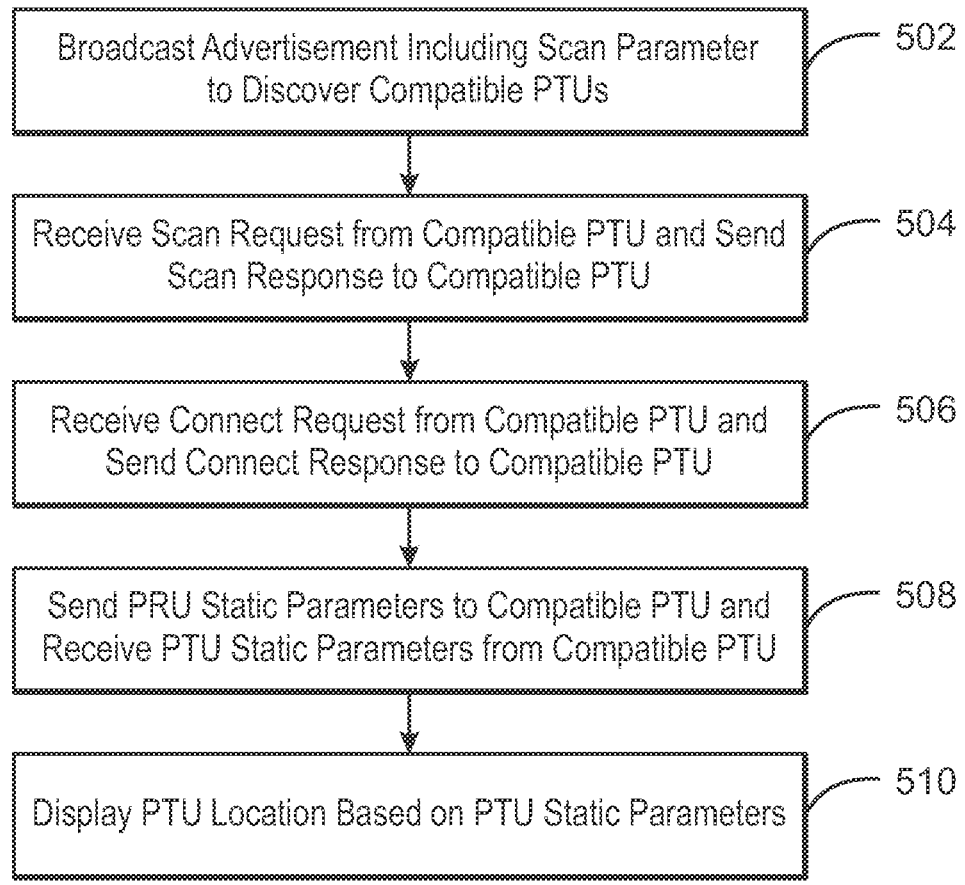
FIG. 5 is a flow chart illustrating a process for locating a PTU via a short range radio connection according embodiments described herein.

FIG. 5 is a flow chart illustrating a process for locating a PTU via a short range radio connection according to embodiments described herein. The example process is generally referred to by the reference number 500 and can be implemented using the computing device 700 of FIG. 7. For example, the process can be performed by the computing device 112 of FIG. 1.

At block 502, the computing device broadcasts an advertisement including a scan parameter to discover compatible PTUs. For example, the scan parameter can include a description of one or more features of a compatible charging station. The scan parameter can be broadcasted to wireless devices using BLE communication.

At block 504, the computing device receives a scan request from a compatible PTU and sends a scan response to the compatible PTU. For example, the scan request and scan response can be used to choose a compatible PTU with which to establish a BLE connection.

At block 506, the computing device receives a connect request from the compatible PTU and sends a connect response to the compatible PTU. For example, the connect request and connect response can be used to establish a BLE connection between the compatible PTU and the computing device.

At block 508, the computing device sends PRU static parameters to the compatible PTU and receives PTU static parameters from the PTU. For example, the PTU static parameters can include a PTU device class, PTU power information, and/or location information such as a longitude of the PTU and a latitude of the PTU, among other information.

At block 510, displays the location of the PTU based on the PTU static parameters. For example, the computing device can display the location of the PTU on a PTU location map. A user can then locate the PTU using the PTU location map and place the PRU in proximity to the PTU.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
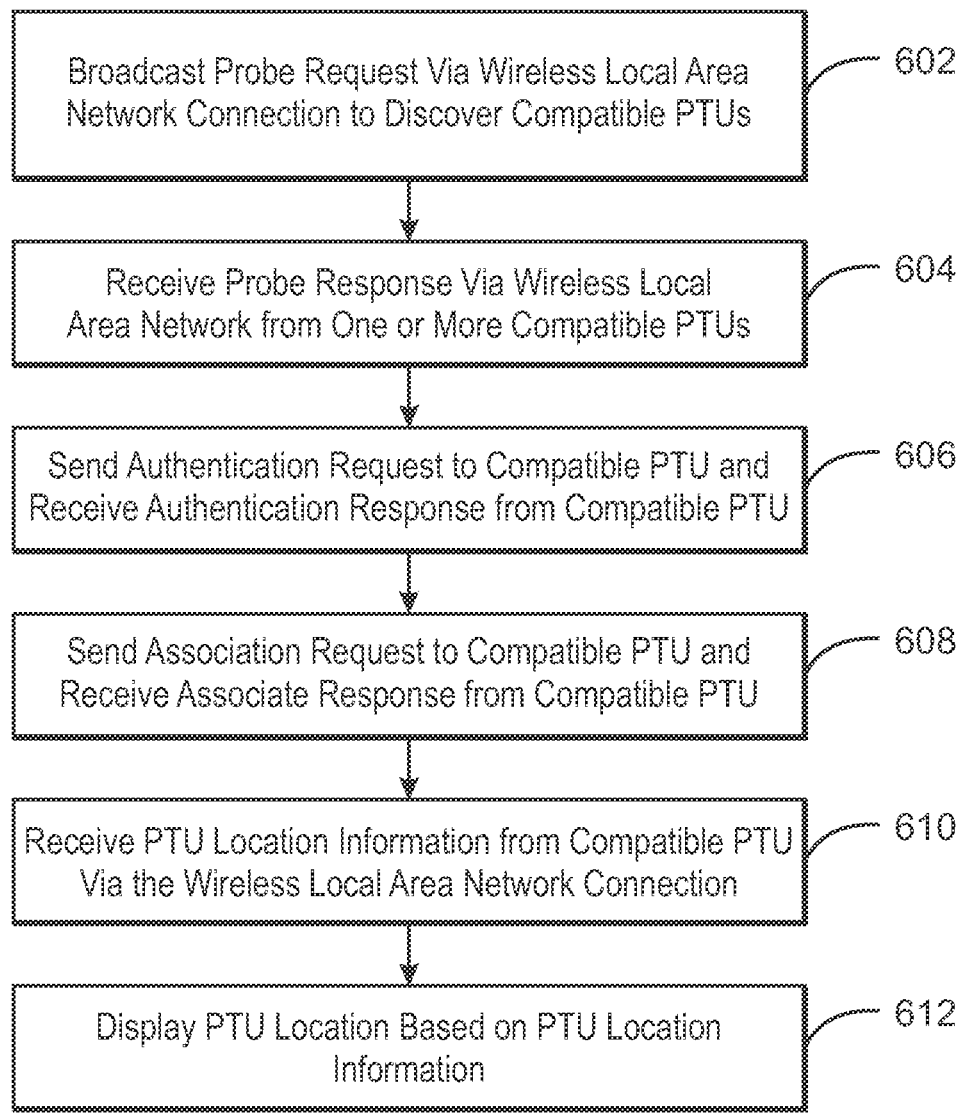
FIG. 6 is a flow chart illustrating a process for locating a PTU via a wireless local area network according embodiments described herein.

FIG. 6 is a flow chart illustrating a process for locating a PTU via a short range radio connection according to embodiments described herein. The example process is generally referred to by the reference number 600 and can be implemented using the computing device 700 of FIG. 7 below. For example, the process can be performed by the computing device 112 of FIG. 1.

At block 602, the computing device broadcasts a probe request via a wireless local area network connection to discover compatible PTUs. For example, the probe request can include one or more capabilities of the computing device.

At block 604, the computing device receives a probe response via the wireless local area network connection from one or more compatible PTUs. For example, the probe response can include wireless network name of the compatible PTU and capabilities of the compatible PTU.

At block 606, the computing device sends an authentication request to a compatible PTU and receives an authentication response from a compatible PTU. For example, the authentication request and the authentication response can both be set to open.

At block 608, the computing device sends an association request and receive an association response. For example, an association request can include wireless compatibilities of the PRU. An association response can include an association ID for the PRU.

At block 610, the computing device receives PTU location information from the compatible PTU via the wireless local area network connection. For example, the PTU location information can include a latitude and longitude of the PTU, among other information.

At block 612, the computing device displays a location of a PTU based on the PTU location information. For example, the computing device can display the location of the PTU on a PTU location map. A user can then locate the PTU using the PTU location map and place the PRU in proximity to the PTU.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation. For example, the authentication of block 606 can in some examples be optional.

Figure 7:
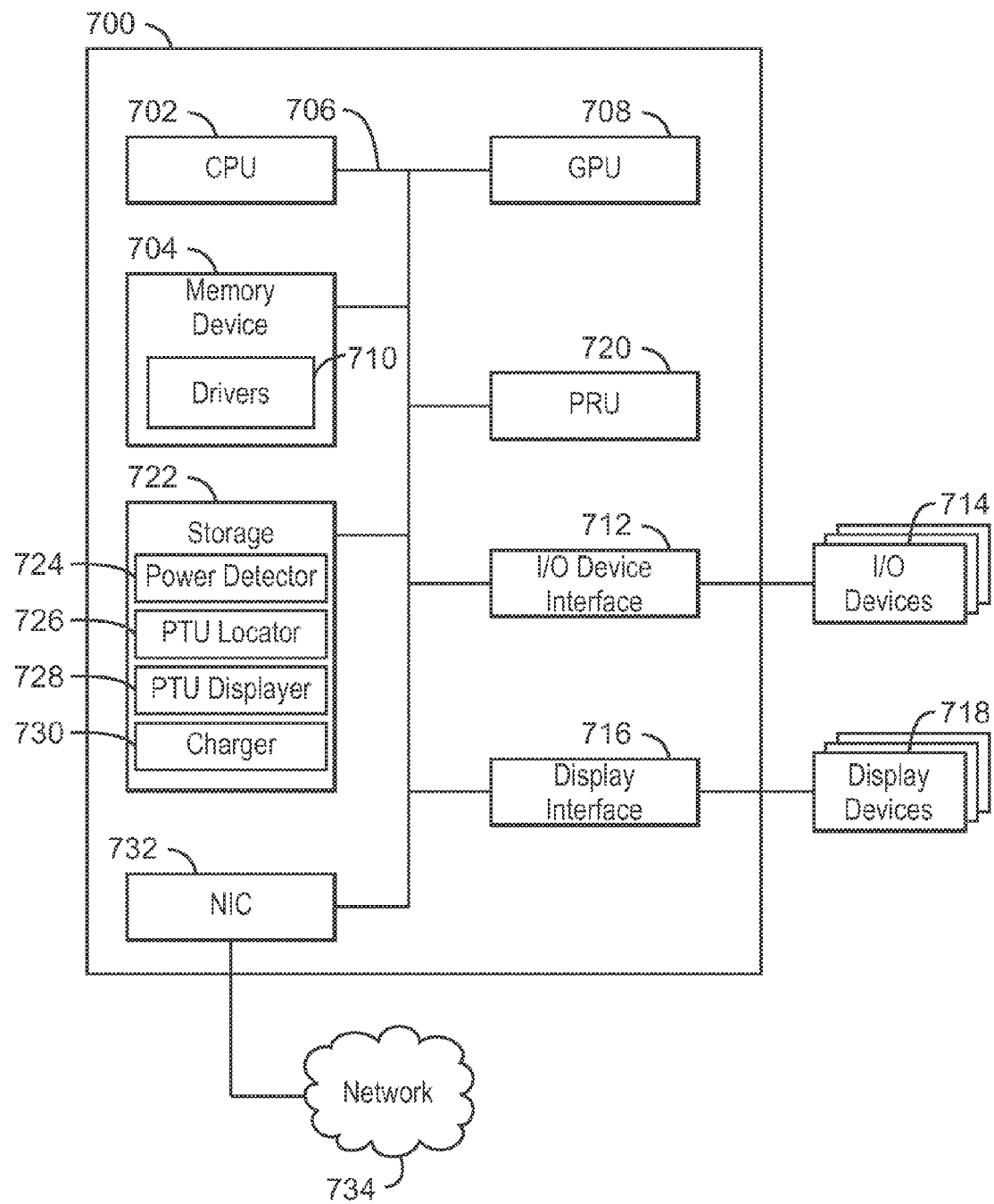
FIG. 7 is a block diagram illustrating an example computing device that can be used to locate a PTU.

FIG. 7 is a block diagram illustrating an example computing device that can be used to locate a PTU. The computing device 700 may be, for example, a laptop computer, desktop computer, tablet computer, mobile device, or server, among others. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for device discovery. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 may also include a power receiver unit (PRU) 720. For example, the power receiving unit can be the PRU of FIG. 1 discussed above.

The computing device also includes a storage device 722. The storage device 722 is a physical memory such as a hard drive, an optical drive, a thumbdrive, an array of drives, or any combinations thereof. The storage device 722 may also include remote storage drives. The storage device 722 includes a power detector 724, a PTU locator 726, a PTU location displayer 728, and a charger 730. The power detector 724 can detect a low battery condition of the computing device 702. For example, the low battery condition may indicate that the computing device 702 including the PRU unit 720 has a low battery. A PTU locator 726 can perform a PTU scan in response to the low battery condition. For example, the PTU locator 726 can broadcast an advertisement including a scan parameter to discover compatible PTUs. For example, the scan parameter can include a description of one or more features of a compatible charging station. The PTU locator 726 can further receive a scan request from a compatible PTU and send a scan response to the compatible PTU. For example, the scan request can include a parameter to indicate a PTU Scan and that the device is searching for PTUs. The scan response can include parameters used to determine PTU compatibility. The PTU locator 726 can further receive a connect request from the compatible PTU and send a connect response to the compatible PTU. The PTU locator 726 send PRU static parameters to the compatible PTU and receive PTU static parameters from the compatible PTU. For example, the PTU static parameters can include a PTU device class, PTU power information, and/or location information such as a longitude of the PTU and a latitude of the PTU, among other information. For example, the PRU static parameters can include a PRU device category, a PRU device class, among other information. In some examples, the PTU locator 726 can broadcast a probe request via a wireless local area network connection to discover compatible PTUs. The PTU locator 726 can further receive a probe response from a compatible PTU via the wireless local area network connection. The PTU locator 726 can send an association request to the compatible PTU and receive an association response from the compatible PTU. For example, the association request can include wireless compatibilities of the computing device and the association response can include an association ID for the computing device. The PTU locator 726 can further receive PTU location information from the compatible PTU via the wireless local area network connection. The PTU displayer 728 can display a location of a PTU based on results of the PTU scan.

In some examples, a computing device with a PRU may have located a PTU and subsequently been placed onto or near the PTU. The charger 730 can be configured to send a PRU dynamic parameter to the compatible PTU. For example, the PRU dynamic parameter can include parameters defined by A4WP spec, such as Vrect, Irect, temperature, etc. The charger 730 can further be configured to receive a PRU control characteristic from the compatible PTU. For example, the PRU control characteristic can include dynamic parameters defined by A4WP spec, such as an enable PRU output parameter, an adjust power parameter, etc. The charger 730 can also be configured to charge the computing device based on the PRU control characteristic.

The computing device 700 may also include a network interface controller (NIC) 732. The NIC 732 may be configured to connect the computing device 700 through the bus 706 to a network 734. The network 734 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The block diagram of FIG. 7 is not intended to indicate that the computing device 700 is to include all of the components shown in FIG. 7. Rather, the computing system 700 can include fewer or additional components not illustrated in FIG. 7, such as additional engines, additional network interfaces, and the like. The computing device 700 may include any number of additional components not shown in FIG. 7, depending on the details of the specific implementation. Furthermore, any of the functionalities of the CPU 702 may be partially, or entirely, implemented in hardware and/or in a processor. For example, the functionality of the classification engine 722, the naming inference engine 724, and the conflict resolution engine 726 may be implemented with an application specific integrated circuit, in logic implemented in a processor, in logic implemented in a specialized graphics processing unit, or in any other device.

Figure 8:
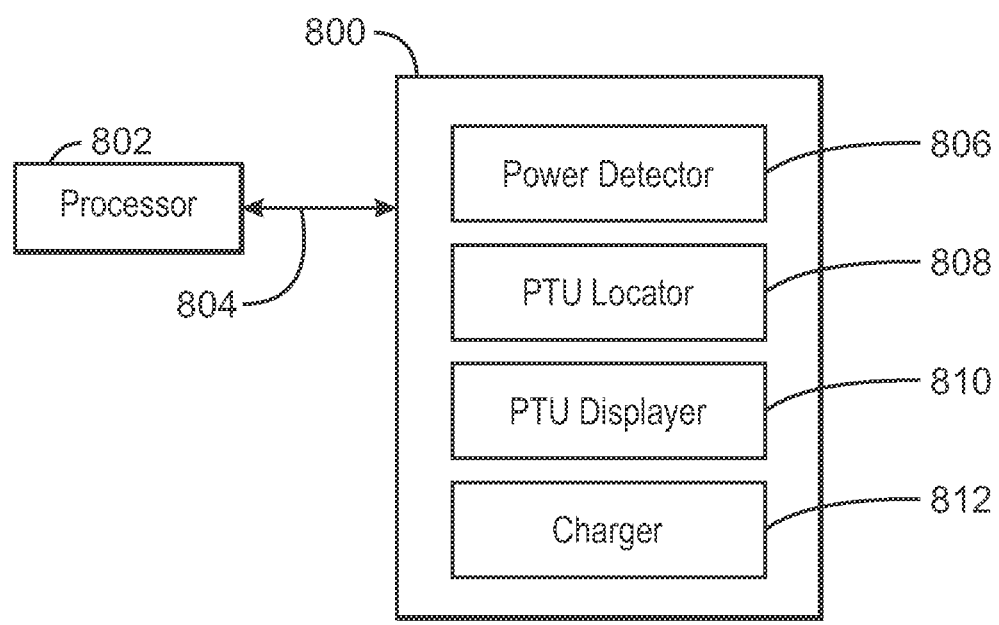
FIG. 8 is a block diagram showing computer readable media that store code for locating PTUs.

FIG. 8 is a block diagram showing computer readable media 800 that store code for locating PTUs. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media. However, in any case, the computer readable media do not include transitory media such as carrier waves, signals, and the like.

The various software components discussed herein may be stored on one or more computer readable media 800, as indicated in FIG. 8. For example, a power detector 806 may be configured to detect a low battery condition. For example, the low battery condition may indicate that a computing device including the PRU unit has a low battery. A PTU locator 808 may be configured to perform a PTU scan in response to the low battery condition. For example, the PTU locator 808 can be configured to broadcast an advertisement including a scan parameter. For example, the scan parameter can include a description of one or more features of a compatible charging station. The PTU locator 808 can further be configured to receive a scan request from a compatible PTU and send a scan response to the compatible PTU. The PTU locator 808 can further be configured to receive a connect request from the compatible PTU and send a connect response to the compatible PTU. The PTU locator 808 can further be configured to send PRU static parameters to the compatible PTU and receive PTU static parameters from the compatible PTU. For example, the PTU static parameters can include a PTU device class, PTU power information, and/or location information such as a longitude of the PTU and a latitude of the PTU, among other information. For example, the PRU static parameters can include a PRU device category, a PRU device class, among other information. In some examples, the PTU locator 808 can be configured to broadcast a probe request via a wireless local area network connection to discover compatible PTUs. The PTU locator 808 can further be configured to receive a probe response from a compatible PTU via the wireless local area network connection. The PTU locator 808 can further be configured to send an association request to the compatible PTU and receive an association response from the compatible PTU. For example, the association request can include wireless compatibilities of the PRU and the association response can include an association ID for the PRU. The PTU locator 808 can further be configured to receive PTU location information from the compatible PTU via the wireless local area network connection. A PTU Displayer 810 may be configured to display a location of a PTU based on the results of the PTU scan.

In some examples, a computing device with a PRU may have located a PTU and subsequently been placed onto or near the PTU. The charger 812 can be configured to send a PRU dynamic parameter to the compatible PTU. For example, the PRU dynamic parameter can include dynamic parameters defined by the A4WP specification, such as Vrect, Irect, temperature, etc. The charger 812 can further be configured to receive a PRU control characteristic. For example, the PRU control characteristic can include dynamic parameters defined by the A4WP specification, such as an enable PRU output parameter, an adjust power parameter, etc. The charger 812 can also be configured to charge the computing device based on the PRU control characteristic.

Still referring to FIG. 8, in some examples, the charger 812 can be configured to send a scan parameter to a compatible PTU. For example, the scan parameter can be sent via an advertisement and can be used to establish a BLE connection. The charger 812 can further be configured to receive a scan request from the compatible PTU and send a scan response to the compatible PTU. The charger 812 can further be configured to receive a connect request from the compatible PTU and send a connect response to the compatible PTU. For example, a BLE connection can be established upon reception of the connection response by the PTU. The charger 812 can further be configured to send PRU static parameters to the compatible PTU and receive PTU static parameters from the compatible PTU. For example, the PRU static parameters can include a PRU device category and a PRU device class. The PTU static parameters can include a PTU device class and PTU power information. The charger 812 can further be configured to charge the computing device based on the PTU static parameters.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

EXAMPLES

Example 1 is an apparatus for locating a power transmission unit (PTU). The apparatus includes a power detector to detect a low battery condition of the apparatus; a PTU locator to perform a PTU scan in response to the low battery condition, the PTU scan to identify a location of the PTU; and a PTU location displayer to display a location of the PTU based on the results of the PTU scan.

Example 2 includes the apparatus of example 1, including or excluding optional features. In this example, the PTU locator is to broadcast an advertisement including a scan parameter to discover compatible PTUs. The scan parameter describes a feature of a compatible charging station. The PTU locator is to receive a scan request from a compatible PTU and send a scan response to the compatible PTU. The PTU locator is to receive a connect request from the compatible PTU and send a connect response to the compatible PTU. The PTU locator is to send PRU static parameters to the compatible PTU and receive PTU static parameters from the compatible PTU. The apparatus includes a short range radio adapter. The PTU locator is to perform the PTU scan via the short range radio adapter. Optionally, the PRU static parameters include a PRU device category, a PRU device class, or both. Optionally, the PTU static parameters include a PTU device class, PTU power information, or both. Optionally, the PTU static parameters include location information including a longitude of the compatible PTU and a latitude of the compatible PTU. Optionally, the apparatus includes a charger to send a PRU dynamic parameter to the compatible PTU. The charger is to receive a PRU control characteristic from the compatible PTU. The charger is to also charge the apparatus based on the PRU control characteristic. Optionally, the PRU dynamic parameter includes a rectifier voltage, a current, or a temperature parameter of the PRU. Optionally, the PRU control characteristic includes an enable PRU output parameter or an adjust power parameter.

Example 3 includes the apparatus of any one of examples 1 to 2, including or excluding optional features. In this example, the PTU locator is to broadcast a probe request via a wireless local area network connection to discover compatible PTUs. The probe request includes capabilities of the apparatus. The PTU locator is to also receive a probe response via the wireless local area network connection from a compatible PTU. The probe response includes a wireless network name of the compatible PTU and capabilities of the compatible PTU. The PTU locator is to also send an association request to the compatible PTU and receive an association response from the compatible PTU. The association request includes wireless compatibilities of the apparatus and the association response includes an association ID for the apparatus. The PTU locator is to also receive PTU location information from the compatible PTU via the wireless local area network connection. The apparatus includes a wireless local area network adapter and the PTU locator is to perform the PTU scan via the wireless local area network adapter. Optionally, the apparatus includes a charger to send a scan parameter to the compatible PTU. The charger can also receive a scan request from the compatible PTU and send a scan response to the compatible PTU. The charger can also receive a connect request from the compatible PTU and send a connect response to the compatible PTU. The charger can also send PRU static parameters to the compatible PTU and receive PTU static parameters from the compatible PTU. The charger can also charge the apparatus based on the PTU static parameters. Optionally, the PRU static parameters include a PRU device category, a PRU device class, or both.

Example 4 is a method for locating a power transmission unit (PTU). The method includes detecting, via a processor, a low battery condition of a computing device; performing, via the processor, a PTU scan in response to the low battery condition; and displaying, via the processor, a location of the PTU based on the results of the PTU scan.

Example 5 includes the method of example 4, including or excluding optional features. In this example, performing the PTU scan includes broadcasting, via the processor, an advertisement including a scan parameter to discover compatible PTUs. The scan parameter describes a feature of a compatible charging station. Performing the PTU scan also includes receiving, via the processor, a scan request from a compatible PTU and sending a scan response to the compatible PTU. Performing the PTU scan also includes receiving, via the processor, a connect request from the compatible PTU and sending a connect response to the compatible PTU. Performing the PTU scan also includes sending, via the processor, PRU static parameters to the compatible PTU. Performing the PTU scan also includes receiving, via the processor, PTU static parameters from the compatible PTU. Optionally, displaying the location of the PTU is based on the PTU static parameters. Optionally, the method includes charging, via the processor, a device based on the PTU static parameters and the PRU static parameters. Optionally, the PTU static parameters include a PTU device class and PTU power information and the PRU static parameters include a PRU device category, a PRU device class, or both.

Example 6 includes the method of any one of examples 4 to 5, including or excluding optional features. In this example, performing the PTU scan includes broadcasting, via the processor, a probe request via a wireless local area network connection to discover compatible PTUs. The probe request includes capabilities of the computing device. Performing the PTU scan also includes receiving, via the processor, a probe response via the wireless local area network connection from a compatible PTU. The probe response includes a wireless network name of the compatible PTU and capabilities of the compatible PTU. Performing the PTU scan also includes sending, via the processor, an association request to the compatible PTU and receiving an association response from the compatible PTU. The association request includes wireless compatibilities of the computing device and the association response includes an association ID for the computing device. Performing the PTU scan also includes receiving, via the processor, PTU location information. Optionally, the method includes sending, via the processor, an authentication request and receiving an authentication response. Optionally, the authentication request and the authentication response are set to open. Optionally, displaying the location of the PTU is based on the PTU location information. Optionally, the method includes broadcasting, via the processor, a scan parameter. Optionally, the method includes receiving, via the processor, a scan request and sending a scan response. Optionally, the method includes receiving, via the processor, a connect request and sending a connect response. Optionally, the method includes receiving, via the processor, PTU static parameters. Optionally, the method includes charging a device based on the PTU static parameters.

Example 7 is a system for locating a power transmission unit (PTU). The system includes a power detector to detect a low battery condition of a computing device. The system also includes a PTU locator to perform a PTU scan in response to the low battery condition. The PTU scan is to identify a location of the PTU. The system also includes a PTU location displayer to display a location of the PTU based on the results of the PTU scan.

Example 8 includes the system of example 7, including or excluding optional features. In this example, the PTU locator is to broadcast an advertisement including a scan parameter to discover compatible PTUs. The scan parameter describes a feature of a compatible charging station. The PTU locator is to also receive a scan request from a compatible PTU and send a scan response to the compatible PTU. The PTU locator is to also receive a connect request from the compatible PTU and send a connect response to the compatible PTU. The PTU locator is to also send PRU static parameters to the compatible PTU and receive PTU static parameters from the compatible PTU. The system includes a short range radio adapter and the PTU locator is to perform the PTU scan via the short range radio adapter. Optionally, the PTU static parameters include a PTU device class, PTU power information, or both. Optionally, the PTU static parameters include location information including a longitude of the PTU and a latitude of the PTU. Optionally, the PTU static parameters include location information including a longitude of the compatible PTU and a latitude of the compatible PTU. Optionally, the system includes a charger to send a PRU dynamic parameter to the compatible PTU. Optionally, the charger is to receive a PRU control characteristic from the compatible PTU. Optionally, the charger is to charge the system based on the PRU control characteristic. Optionally, the PRU dynamic parameter includes a rectifier voltage, a current, or a temperature parameter of the PRU, and wherein the PRU control characteristic includes an enable PRU output parameter or an adjust power parameter.

Example 9 includes the system of any one of examples 7 to 8, including or excluding optional features. In this example, the PTU locator is to broadcast a probe request via a wireless local area network connection to discover compatible PTUs. The probe request includes capabilities of the apparatus. The PTU locator is to also receive a probe response via the wireless local area network connection from a compatible PTU. The probe response includes a wireless network name of the compatible PTU and capabilities of the compatible PTU. The PTU locator is to also send an association request to the compatible PTU and receive an association response from the compatible PTU. The association request includes wireless compatibilities of the apparatus and the association response includes an association ID for the apparatus. The PTU locator is to also receive PTU location information from the compatible PTU via the wireless local area network connection. The apparatus includes a wireless local area network adapter and the PTU locator is to perform the PTU scan via the wireless local area network adapter. Optionally, the apparatus includes a charger to send a scan parameter to the compatible PTU. The charger can also receive a scan request from the compatible PTU and send a scan response to the compatible PTU. The charger can also receive a connect request from the compatible PTU and send a connect response to the compatible PTU. The charger can also send PRU static parameters to the compatible PTU and receive PTU static parameters from the compatible PTU. The charger can also charge the apparatus based on the PTU static parameters. Optionally, the PRU static parameters include a PRU device category, a PRU device class, or both.

Example 10 is a tangible, non-transitory, computer-readable medium including instructions that, when executed by a processor, direct the processor to locate a power transmission unit (PTU). The computer-readable medium includes instructions that direct the processor to detect a low battery condition of the computing device; perform a PTU scan in response to the low battery condition, the PTU scan to identify a location of the PTU; and display a location of the PTU based on the results of the PTU scan.

Example 11 includes the computer-readable medium of example 10, including or excluding optional features. In this example, the computer-readable medium includes instructions to broadcast an advertisement including a scan parameter to discover compatible PTUs. The scan parameter describes a feature of a compatible charging station. The computer-readable medium also includes instructions to receive a scan request from a compatible PTU and send a scan response to the compatible PTU. The computer-readable medium also includes instructions to receive a connect request from the compatible PTU and send a connect response to the compatible PTU. The computer-readable medium also includes instructions to send PRU static parameters to the compatible PTU and receive PTU static parameters from the compatible PTU. Optionally, the PRU static parameters include a PRU device category, a PRU device class, or both. Optionally, the PTU static parameters include a PTU device class, PTU power information, or both. Optionally, the PTU static parameters include location information including a longitude of the compatible PTU and a latitude of the compatible PTU. Optionally, the computer-readable medium includes instructions to send a PRU dynamic parameter to the compatible PTU. Optionally, the computer-readable medium includes instructions to receive a PRU control characteristic from the compatible PTU. Optionally, the computer-readable medium includes instructions to charge the computing device based on the PRU control characteristic. Optionally, the PRU dynamic parameter includes a rectifier voltage, a current, or a temperature parameter of the PRU, and wherein the PRU control characteristic includes an enable PRU output parameter or an adjust power parameter.

Example 12 includes the computer-readable medium of any one of examples 10 to 11, including or excluding optional features. In this example, the computer-readable medium includes instructions to broadcast a probe request via a wireless local area network connection to discover compatible PTUs. The probe request includes capabilities of the computing device; receive a probe response via the wireless local area network connection from a compatible PTU. The probe response includes a wireless network name of the compatible PTU and capabilities of the compatible PTU. The computer-readable medium includes instructions to send an association request to the compatible PTU and receive an association response from the compatible PTU. The association request includes wireless compatibilities of the computing device and the association response includes an association ID for the computing device. The computer-readable medium includes instructions to receive PTU location information from the compatible PTU via the wireless local area network connection. Optionally, the computer-readable medium includes instructions to send a scan parameter to the compatible PTU. Optionally, the computer-readable medium includes instructions to receive a scan request from the compatible PTU and send a scan response to the compatible PTU. Optionally, the computer-readable medium includes instructions to receive a connect request from the compatible PTU and send a connect response to the compatible PTU. Optionally, the computer-readable medium includes instructions to send PRU static parameters to the compatible PTU and receive PTU static parameters from the compatible PTU. Optionally, the computer-readable medium includes instructions to charge the computing device based on the PTU static parameters. Optionally, the PRU static parameters include a PRU device category, a PRU device class, or both.

Example 13 is a system for locating a power transmission unit (PTU). The system includes instructions that direct the processor to means to detect a low battery condition of a computing device; means to perform a PTU scan in response to the low battery condition, the PTU scan to identify a location of the PTU; and means to display a location of the PTU based on the results of the PTU scan. Optionally, the system includes means to broadcast an advertisement including a scan parameter to discover compatible PTUs. The scan parameter describes a feature of a compatible charging station. Optionally, the system includes means to receive a scan request from a compatible PTU and send a scan response to the compatible PTU. Optionally, the system includes means to receive a connect request from the compatible PTU and send a connect response to the compatible PTU. Optionally, the system includes means to send PRU static parameters to the compatible PTU and receive PTU static parameters from the compatible PTU. Optionally, the PTU static parameters include a PTU device class, PTU power information, or both. Optionally, the PTU static parameters include location information including a longitude of the PTU and a latitude of the PTU. Optionally, the PTU static parameters include location information including a longitude of the compatible PTU and a latitude of the compatible PTU. Optionally, the system includes means to send a PRU dynamic parameter to the compatible PTU; means to receive a PRU control characteristic from the compatible PTU; and means to charge the system based on the PRU control characteristic. Optionally, the PRU dynamic parameter includes a rectifier voltage, a current, or a temperature parameter of the PRU, and wherein the PRU control characteristic includes an enable PRU output parameter or an adjust power parameter.

Example 14 includes the system of any one of examples 13 to 13, including or excluding optional features. In this example, the system includes means to broadcast a probe request via a wireless local area network connection to discover compatible PTUs. The probe request includes capabilities of the computing device. The system also includes means to receive a probe response via the wireless local area network connection from a compatible PTU. The probe response includes a wireless network name of the compatible PTU and capabilities of the compatible PTU. The system includes means to send an association request to the compatible PTU and receive an association response from the compatible PTU. The association request includes wireless compatibilities of the PRU and the association response includes an association ID for the PRU. The system also includes means to receive PTU location information. Optionally, the system includes means to send a scan parameter to the compatible PTU. Optionally, the system includes means to receive a scan request from the compatible PTU and send a scan response to the compatible PTU. Optionally, the system includes means to receive a connect request from the compatible PTU and send a connect response to the compatible PTU. Optionally, the system includes means to send PRU static parameters to the compatible PTU and receive PTU static parameters from the compatible PTU. Optionally, the system includes means to charge the system based on the PTU static parameters. Optionally, the PRU static parameters include a PRU device category, a PRU device class, or both.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/ or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for locating a power transmission unit (PTU) via a short range radio adapter, comprising:
   a power detector to detect a low battery condition of the apparatus;
   a PTU locator to perform a PTU scan in response to the low battery condition, the PTU scan to identify a location of the PTU, wherein the PTU locator is to:
   broadcast a scan parameter to discover compatible PTUs;
   receive a scan request from a compatible PTU of the compatible PTUs and send a scan response to the compatible PTU;
   receive a connect request from the compatible PTU and send a connect response to the compatible PTU; and
   send power receiving unit (PRU) static parameters to the compatible PTU and receive PTU static parameters from the compatible PTU; and
   a PTU location displayer to display a location of the compatible PTU based on the results of the PTU scan.

2. The apparatus of claim 1, wherein the PRU static parameters comprise a PRU device category, a PRU device class, or both.

3. The apparatus of claim 1, wherein the PTU static parameters comprise a PTU device class, PTU power information, or both.

4. The apparatus of claim 1, wherein the PTU static parameters comprise location information comprising a longitude of the compatible PTU and a latitude of the compatible PTU.

5. The apparatus of claim 1, further comprising a charger to:
   send a PRU dynamic parameter to the compatible PTU;
   receive a PRU control characteristic from the compatible PTU; and
   charge the apparatus based on the PRU control characteristic.

6. The apparatus of claim 5, wherein the PRU dynamic parameter comprises a rectifier voltage, a current, or a temperature parameter of the PRU, and wherein the PRU control characteristic comprises an enable PRU output parameter or an adjust power parameter.

7. The system of claim 1, the scan parameter comprising a feature of a compatible charging station.

8. An apparatus for locating a power transmission unit (PTU), comprising:
   a power detector to detect a low battery condition of the apparatus;
   a PTU locator to perform a PTU scan in response to the low battery condition, the PTU scan to identify a location of the PTU, wherein to perform the PTU scan the PTU locator is to:
   broadcast a probe request via a wireless local area network connection to discover compatible PTUs, the probe request comprising capabilities of the apparatus;
   receive a probe response via the wireless local area network connection from a compatible PTU of the compatible PTUs, the probe response comprising a wireless network name of the compatible PTU and capabilities of the compatible PTU;
   send an association request to the compatible PTU and receive an association response from the compatible PTU, the association request comprising wireless compatibilities of the apparatus and the association response comprising an association ID for the apparatus; and
   receive PTU location information from the compatible PTU via the wireless local area network connection; and
   a PTU location displayer to display a location of the compatible PTU based on the results of a PTU probe, wherein the apparatus comprises a wireless local area network adapter, the PTU locator to perform the PTU probe via the wireless local area network adapter.

9. The apparatus of claim 8, further comprising a charger to:
   send a scan parameter to the compatible PTU;
   receive a scan request from the compatible PTU and send a scan response to the compatible PTU;
   receive a connect request from the compatible PTU and send a connect response to the compatible PTU;
   send PRU static parameters to the compatible PTU and receive PTU static parameters from the compatible PTU; and
   charge the apparatus based on the PTU static parameters.

10. The apparatus of claim 8, wherein power receiving unit (PRU) static parameters comprise a PRU device category, a PRU device class, or both.

11. A method for locating a power transmission unit (PTU), comprising:
- detecting, via a processor, a low battery condition of a computing device;
- performing, via the processor, a PTU scan in response to the low battery condition, wherein performing the PTU scan further comprises:
  - broadcasting, via the processor, an advertisement comprising a scan parameter to discover compatible PTUs, the scan parameter describing a feature of a compatible charging station;
  - receiving, via the processor, a scan request from a compatible PTU of the compatible PTUs and sending a scan response to the compatible PTU;
  - receiving, via the processor, a connect request from the compatible PTU and sending a connect response to the compatible PTU;
  - sending, via the processor, power receiving unit (PRU) static parameters to the compatible PTU; and
  - receiving, via the processor, PTU static parameters from the compatible PTU; and
- displaying, via the processor, a location of the compatible PTU based on the results of the PTU scan.

12. The method of claim 11, wherein said displaying the location of the compatible PTU is based on the compatible PTU static parameters.

13. The method of claim 11, further comprising charging, via the processor, a device based on the compatible PTU static parameters and the PRU static parameters.

14. The method of claim 11, wherein the PTU static parameters comprise a PTU device class and PTU power information and the PRU static parameters comprise a PRU device category, a PRU device class, or both.

15. A method for locating a power transmission unit (PTU), comprising:
- detecting, via a processor, a low battery condition of a computing device;
- performing, via the processor, a PTU scan in response to the low battery condition, wherein performing the PTU scan further comprises:
  - broadcasting, via the processor, a probe request via a wireless local area network connection to discover compatible PTUs, the probe request comprising capabilities of the computing device;
  - receiving, via the processor, a probe response via the wireless local area network connection from a compatible PTU of the compatible PTUs, the probe response comprising a wireless network name of the compatible PTU and capabilities of the compatible PTU;
  - sending, via the processor, an association request to the compatible PTU and receiving an association response from the compatible PTU, the association request comprising wireless compatibilities of the computing device and the association response comprising an association ID for the computing device; and
  - receiving, via the processor, PTU location information corresponding to the compatible PTU; and
- displaying, via the processor, a location of the compatible PTU based on the results of the PTU scan.

16. The method of claim 15, further comprising sending, via the processor, an authentication request and receiving an authentication response, wherein the authentication request and the authentication response are set to an open authentication setting.

17. The method of claim 15, wherein said displaying the location of the compatible PTU is based on the PTU location information.

18. The method of claim 15, further comprising:
- broadcasting, via the processor, a scan parameter;
- receiving, via the processor, a scan request and sending a scan response;
- receiving, via the processor, a connect request and sending a connect response; and
- receiving, via the processor, PTU static parameters.

19. The method of claim 15, further comprising charging a device based on the compatible PTU static parameters.

20. A system for locating a power transmission unit (PTU), comprising:
- a power detector to detect a low battery condition of a computing device;
- a PTU locator to perform a PTU scan in response to the low battery condition, the PTU scan to identify a location of the PTU, wherein to perform the PTU scan the PTU locator is to further:
  - broadcast an advertisement comprising a scan parameter to discover compatible PTUs, the scan parameter describing a feature of a compatible charging station;
  - receive a scan request from a compatible PTU of the compatible PTUs and send a scan response to the compatible PTU;
  - receive a connect request from the compatible PTU and send a connect response to the compatible PTU;
  - send PRU static parameters to the compatible PTU and receive PTU static parameters from the compatible PTU; and
- a PTU location displayer to display the location of the compatible PTU based on the results of the PTU scan, wherein the system comprises a short range radio adapter, the PTU locator to perform the PTU scan via the short range radio adapter.

21. The system of claim 20, wherein the PTU static parameters comprise a PTU device class, PTU power information, or both.

22. The system of claim 20, wherein the PTU static parameters comprise location information comprising a longitude of the PTU and a latitude of the PTU.

23. A system for locating a power transmission unit (PTU), comprising:
- a power detector to detect a low battery condition of a computing device;
- a PTU locator to perform a PTU scan in response to the low battery condition, the PTU scan to identify a location of the PTU, wherein to perform the PTU scan the PTU locator is further to:
  - broadcast a probe request via a wireless local area network connection to discover compatible PTUs, the probe request comprising capabilities of the computing device;
  - receive a probe response via the wireless local area network connection from a compatible PTU of the compatible PTUs, the probe response comprising a wireless network name of the compatible PTU and capabilities of the compatible PTU;
  - send an association request to the compatible PTU and receive an association response from the compatible PTU, the association request comprising wireless compatibilities of a power receiving unit (PRU) and the association response comprising an association ID for the PRU; and receive PTU location information corresponding to the compatible PTU; and a PTU location displayer to display the-location of the compatible PTU based on the results of the PTU scan, wherein the system comprises a wireless local area network adapter, the PTU locator to perform the PTU scan via the wireless local area network adapter.

\* \* \* \* \*